United States Patent
Palvoelgyi et al.

(10) Patent No.: US 6,443,195 B2
(45) Date of Patent: Sep. 3, 2002

(54) FILLER NECK

(75) Inventors: Sandor Palvoelgyi, Gleisdorf; Günther Pozgainer; Gerald Lackner, both of Graz; Bernhard Maier, Bad Gleichenberg, all of (AT)

(73) Assignee: Tesma Motoren und Getriebetechnik GmbH, Gleisdorf (AT)

( * ) Notice: Subject to any disclaimer, the term of this patent is extended or adjusted under 35 U.S.C. 154(b) by 0 days.

(21) Appl. No.: 09/822,702

(22) Filed: Mar. 30, 2001

(30) Foreign Application Priority Data

Mar. 31, 2000 (AT) ..................................... GM 246/2000

(51) Int. Cl.[7] ................................................. B65B 1/04
(52) U.S. Cl. ........................ 141/350; 141/301; 220/86.2
(58) Field of Search ................................. 141/349, 350, 141/301; 220/86.2

(56) References Cited

U.S. PATENT DOCUMENTS 5,791,387 A * 8/1998 Palvolgyi
6,009,920 A * 1/2000 Palvoelgyi et al.

* cited by examiner

*Primary Examiner*—Steven O. Douglas
(74) *Attorney, Agent, or Firm*—Clark Hill PLC

(57) ABSTRACT

A filler neck for the fuel tank of a motor vehicle with a shutter which is mounted inside the filler neck and which can be actuated by the pump nozzle into an open position for filling the fuel tank and into a closed position via an actuating mechanism. The actuating mechanism of the shutter cooperates with a damping device during the closing movement in such a way that the shutter can be closed with a time delay.

4 Claims, 1 Drawing Sheet

FILLER NECK

FIELD OF INVENTION

The invention relates to a filler neck for a fuel tank of a motor vehicle. More particularly, the invention relates to a filler neck with a shutter which is mounted inside the filler neck and can be brought by a pump nozzle into an open position for filling the fuel tank and into a closed position via an actuating mechanism for closing the filler neck.

BACKGROUND OF INVENTION

A filler neck for a fuel tank of a motor vehicle is known, for example, from WO 99/03697. In this filler neck, an internally mounted shutter is provided, which replaces the generally conventional tank caps capable of being either screwed on or attached via a bayonet fastening from outside to the filler neck of the fuel tank. The shutter, when in a closed position, ensures a gas-tight and liquid-tight seal between the fuel tank on one side and the ambient air on the other side. An actuating mechanism operates in such a way that the shutter is immediately closed as soon as a fuel pump nozzle has been drawn out of the filler neck. With the shutter in the closed position, any fuel droplets still running out of the fuel pump nozzle can no longer run off into the fuel tank. These fuel droplets remain on the closed shutter or in the region outside the latter and evaporate into the ambient air in an undesirable way.

SUMMARY OF INVENTION

The disadvantages of the prior art may be overcome by providing a filler neck for the fuel tank of a motor vehicle comprising a housing having a tubular port defining an orifice in fluid communication with the fuel tank of the vehicle. A shutter is coupled to the housing and operable between a closed position closing the orifice of the tubular port and an open position opening the orifice to allow fluid into the fuel tank. An actuating mechanism is operatively coupled between the housing and the shutter for actuating and biasing the shutter from the open position to the closed position. The actuating mechanism includes a lever pivotally coupled to the housing and cooperative with the shutter for automatically moving the shutter from the open position to the closed position. A damping device is operatively coupled to the lever for delaying the automatic movement of the shutter from the open position to the closed position upon removal of a fuel pump nozzle from the tubular port thereby allow any residual fuel from the nozzle to enter the orifice prior to the shutter reaching the closed position.

The object on which the invention is based is, therefore, in a filler neck of the type initially mentioned, to ensure in a simple way that the fuel droplets still subsequently running out no longer evaporate into the ambient air.

The set object is achieved, according to the invention, in that the actuating mechanism of the shutter cooperates with a damping device during the closing movement, in such a way that the shutter can be closed with a time delay.

This ensures in a simple way that droplets subsequently running out have sufficient time to run off in the direction of the fuel tank.

It is also particularly advantageous if the damping device is uncoupled from the actuatin mechanism when the shutter is closed. This ensures that any functioning of the spring-loaded shutter as a vacuum valve cannot be impaired and cannot be influenced by the damping device.

An embodiment of the invention is preferred, in which the shutter can be brought into its open position in a manner at least essentially uninfluenced by the damping device. The opening of the shutter during the introduction of the pump nozzle therefore does not require any additional forces to be overcome. This therefore also ensures that the damping device does not have to be co-actuated during the opening of the shutter, this being advantageous, for example, in the case of relatively low outside temperatures, where extra loads on the actuating mechanism could result in damage to the latter.

If, then, the actuating mechanism of the shutter is designed in such a way that it has an actuating lever which acts upon the shutter and cooperates with a first row of teeth on a toothed rack, there can be provision in a simple way, to ensure cooperation with a damping device, for the rack to have a second row of teeth which, during the opening movement of the shutter, can be brought into engagement with a gearwheel or the like which is operatively connected to the damping device.

In this embodiment, the desired uncoupling of the damping device from the actuating mechanism of the shutter when the latter is in the closed position can follow in a very simple way, in that, during the closing movement of the shutter, the gearwheel comes out of engagement again with the rows of teeth on the rack.

In this embodiment, it is also particularly advantageous if the damping device is a rotary damper which can be actuated in its undamped direction of rotation during the opening movement of the shutter. A rotary damper is particularly suitable for cooperating with the already existing rack and takes up only a small amount of space.

In the present invention, however, other types of damping devices, such as, for example, a linear damper, may advantageously also be used. Depending on the type of damping action or damping mechanism, silicone-oil dampers, air dampers or friction dampers, or the like, may be considered.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

The Figures of the drawings illustrate only those parts of the filler neck which are important for the functioning and understanding of the present invention. It is pointed out that the other components which are not illustrated may be designed, in particular, according to the embodiment of a filler neck illustrated in FIGS. 1–6 of WO 99/03697. The following description also refers at some points to WO 99/03697, which is incorporated by reference herein in its entirety.

Figure 1:
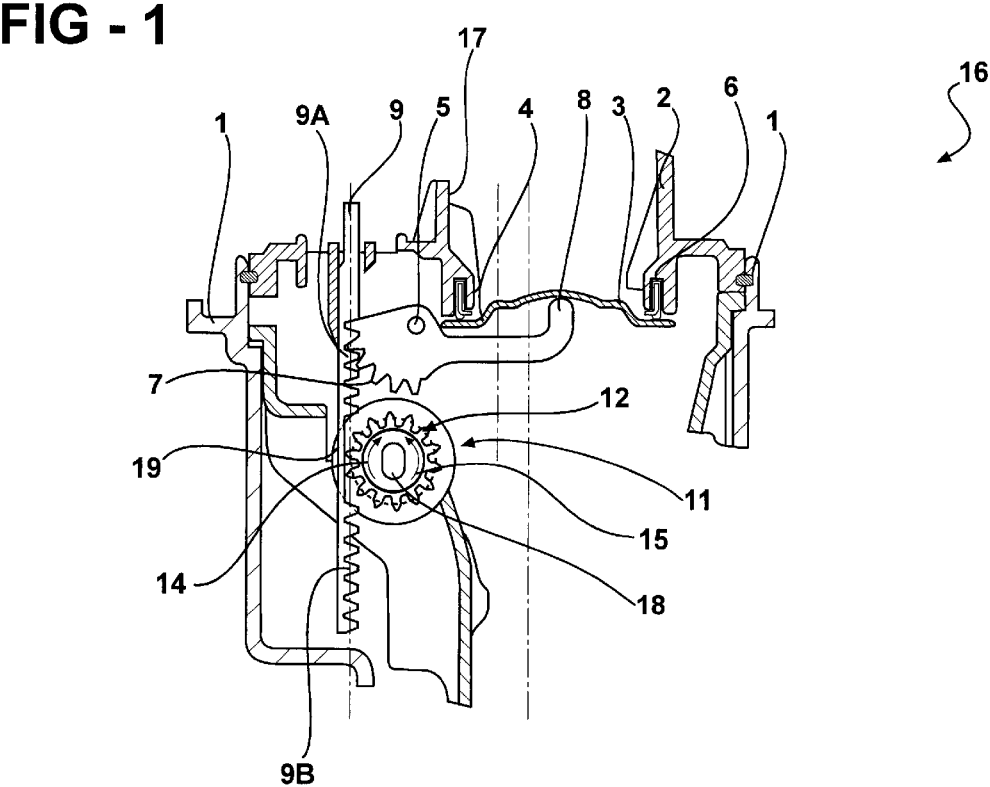
FIG. 1 is a cross-sectional view of a filler neck with the shutter in a closed position.
Figure 2:
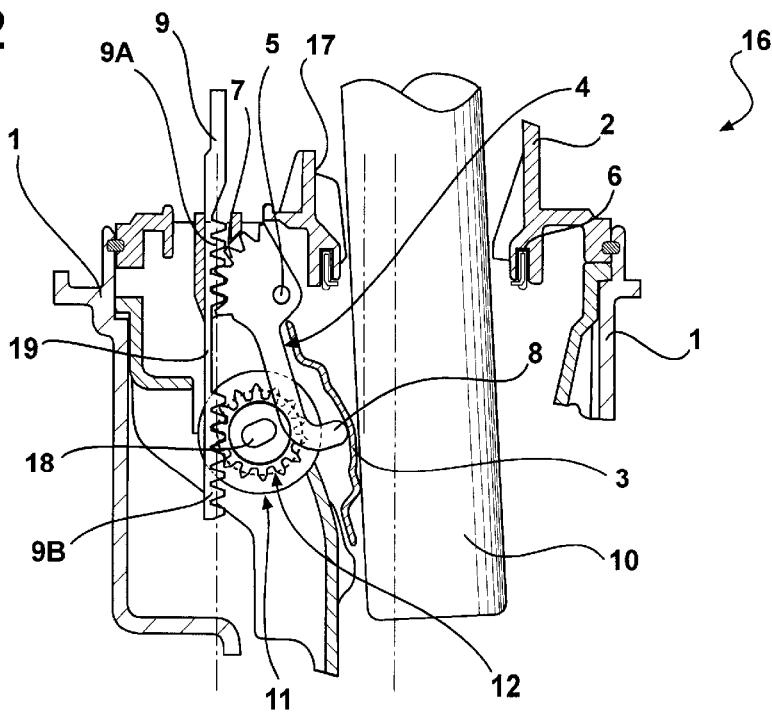
FIG. 2 is a cross-sectional view of the filler neck with the shutter in an open position.

Referring to FIGS. 1 and 2, a filler neck for a fuel tank of a motor vehicle is generally illustrated at 16 including an outer housing 1, shown only partially here, on which an outer flap can be mounted so as to cover the filler neck 16 from outside ambient air. The configuration and arrangement of the outer flap may be similar to those according to FIGS. 3 and 4 of WO 99/03697. When the fuel tank of the vehicle is being filled, this outer flap is opened, and, after filling up, is closed again.

The actual cap of the filler neck 16 is formed by a shutter 3 which is arranged and mounted to the filler neck 16 and which closes an orifice 17 formed by a tubular housing 2. When the tank is being filled, the shutter 3 is pressed away by a fuel pump nozzle 10 to an open position, shown in FIG.

2, and the orifice 17 is exposed or opened. In the closed position illustrated in FIG. 1, the shutter 3 is acted upon, in particular centrally, by an actuating lever 4 and is pressed against a seal 6 inserted in a peripheral groove on the edge region of the tubular housing 2. The actuating lever 4 is rotatably mounted on a shaft 5 which is fixed to the housing 1. The shutter 3 is also pivotably coupled on the shaft 5 in a way to pivot with the rotation of the shaft 5. The actuating lever 4 includes, on one side of the shaft 5, an L-shaped arm 8, by means of which the shutter 3 is acted upon from below. On the other side of the shaft 5, the actuating lever 4 includes a curved rack of gear teeth 7 which are partially in cooperative engagement with a first row of teeth 9a supported by a linear rack 9. The gear teeth 7 and first row of teeth 9a cooperate in a way described in more detail below.

The rack 9 is mounted displaceably relative to the housing 1 and is spring-loaded such that the actuating lever 4 presses the shutter 3 into its closed position via the teeth 7, 9a which are in engagement with one another. The spring loading of the rack 9 may take place via a spring/piston system, such as is illustrated, for example, in FIG. 2 of WO 99/03697.

Furthermore, the rack 9 cooperates with a damping device 11. In the embodiment illustrated, this damping device 11 is a rotary damper having an outer gearwheel 12, the teeth of which can be brought into engagement with a second row of teeth 9b on the rack 9. In the embodiment illustrated, the damping device 11 is arranged on or fastened, below the actuating lever 4, and rotatably mounted to a shaft 18 fixed to the housing 1. The first and second rows of teeth 9a, 9b on the rack 9 are separated from one another by a tooth-free portion 19 of the rack 9. In the initial position shown in FIG. 1, the gearwheel 12 of the damping device 11 is located adjacent the tooth-free portion 19.

The rotary damper 11, actuable via the gearwheel 12, may have an operating mode in which damping takes place in only one of the two directions of rotation. The arrow 14 in FIG. 1 shows the undamped direction of rotation and the arrow 15 shows the damped direction of rotation. It is also possible, however, to use a rotary damper without a freewheel, in which damping therefore takes place in both directions of rotation.

In operation, the shutter 3 is opened as result of the introduction of the pump nozzle 10 into the orifice 17 in order to fill up the vehicle tank with fuel. The actuating lever 4 is pivoted clockwise via the shutter 3, with the result that the rack 9 is displaced upward, counter to the force of the spring load, via the intermeshed teeth 7, 9a which are in engagement with one another. At the same time, the second row of teeth 9b of the rack 9 come into engagement with teeth 7 of the gearwheel 12 which actuates the damping device 11 in its undamped direction of rotation, or clockwise as shown.

After the tank has been filled up, the pump nozzle 10 is removed from the orifice 17 and the spring-loaded rack 9 is displaced downward again. This initiates the closing movement of the shutter 3, which, however, takes place with a time delay by means of the damping device 11, which in this case is actuated in its damped direction of rotation. This delay ensures that any fuel droplets still present can flow off into the tank. When the shutter 3 is in the closed position, the damping device 11 is uncoupled from the actuating mechanism of the shutter 3 again, thus preventing a residual moment or a residual force from being capable of acting on the shutter 3. That is, when the shutter 3 is in the closed position, the gearwheel 12 is disengaged from the rack 9 and seated along the tooth-free portion 19 between the first and second rows of teeth 9a, 9b.

The invention has been described in an illustrative manner, and it is to be understood that the terminology, which has been used, is intended to be in the nature of words of description rather than of limitation.

Many modifications and variations of the present invention are possible in light of the above teachings. Thus, for example, the shutter may be designed and mounted differently, and the mechanism for actuating the shutter may be designed in a different way. With regards to the damping device, this may be accommodated at a different point, as illustrated, and/or another type of damper, for example a linear damper, may be used. With regards to the damping medium or the type of damping, silicone-oil dampers, air dampers or friction dampers, or the like may be considered.

It is, therefore, to be understood that within the scope of the appended claims, the invention may be practised other than as specifically described

What is claimed:

1. A filler neck for the fuel tank of a motor vehicle comprising:

a housing having a tubular port defining an orifice in fluid communication with the fuel tank of the vehicle;

a shutter coupled to said housing and operable between a closed position closing said orifice of said tubular port and an open position opening said orifice to allow fluid into the fuel tank;

an actuating mechanism operatively coupled between said housing and said shutter for actuating and biasing said shutter from said open position to said closed position; said actuating mechanism including a lever pivotally coupled to said housing and cooperative with said shutter for automatically moving said shutter from said open position to said closed position, a damping device operatively coupled to said lever for delaying said automatic movement of said shutter from said open position to said closed position upon removal of a fuel pump nozzle from said tubular port thereby allowing any residual fuel from the nozzle to enter said orifice prior to said shutter reaching said closed position, and a rack slidably coupled to said housing and operatively coupled to said lever for automatically biasing said lever into contact with said shutter and said shutter to said closed position, said rack including a first row of teeth and said lever including a curved rack of teeth meshed with said first row of teeth of said rack whereby linear sliding movement of said rack along said housing pivots said lever and actuates said movement of said shutter between said open and closed positions.

2. A filler neck as set forth in claim 1 wherein said rack includes a second row of teeth spaced from said first row of teeth and said damping device includes a toothed gear wheel engagable with said second row of teeth on said rack when said shutter is in said open position for damping and delaying said automatic movement of said shutter from said open position to said closed position when said nozzle is removed from the tubular port.

3. A filler neck as set forth in claim 2 wherein said rack includes a tooth-free portion separating said first row and second row of teeth for aligning with and uncoupling said gear wheel from said rack when said shutter is in said closed position.

4. A filler neck as set forth in claim 3 wherein said damping device is a rotary damper rotatably connected to said housing adjacent said rack for cooperative therewith.

* * * * *

UNITED STATES PATENT AND TRADEMARK OFFICE
CERTIFICATE OF CORRECTION

PATENT NO.    : 6,443,195 B2
DATED         : September 3, 2002
INVENTOR(S)   : Palvoelgyi et al.

It is certified that error appears in the above-identified patent and that said Letters Patent is hereby corrected as shown below:

Column 1,
Line 46, delete "allow" and insert -- allowing -- therefor;
Line 60, delete "actuatin" and insert -- actuating -- therefor; and Column 4,
Line 64, delete "cooperative" and insert -- cooperation -- therefor.

Signed and Sealed this

Fourth Day of February, 2003

JAMES E. ROGAN
*Director of the United States Patent and Trademark Office*